United States Patent [19]

Kopernicky et al.

[11] Patent Number: 5,464,537

[45] Date of Patent: Nov. 7, 1995

[54] FILTERING DEBRIS FROM MOLTEN PLASTIC

[76] Inventors: Jaroslav J. Kopernicky, 3 Vivians Crescent, Brampton, Canada, L6Y 4T9; Salvatore Infan, 3 Heale Avenue, Scarborough, Ontario, Canada, M1N 3X6

[21] Appl. No.: 318,210

[22] Filed: Oct. 5, 1994

Related U.S. Application Data

[63] Continuation of Ser. No. 996,023, Dec. 23, 1992, abandoned.

[51] Int. Cl.⁶ .......................... B01D 29/05; B01D 35/00; B01D 35/18
[52] U.S. Cl. .......................... 210/453; 210/181; 210/184; 210/186; 210/420; 210/422; 210/450; 210/451; 210/455; 425/197
[58] Field of Search .................................... 210/162, 181, 210/184, 186, 420, 422, 450, 451, 453, 455, 447, 236; 425/197

[56] References Cited

U.S. PATENT DOCUMENTS

| | | | |
|---|---|---|---|
| 3,817,377 | 6/1974 | Piggot | 425/197 |
| 4,453,905 | 6/1984 | Bennett | 425/197 |
| 4,486,304 | 12/1984 | Neuman et al. | 425/197 |

Primary Examiner—John Kim
Attorney, Agent, or Firm—Mirek A. Waraksa

[57] ABSTRACT

A filter for removing debris from a flow of molten plastic includes a cartridge containing a screen and a holder which seats one face of the cartridge. The flow of molten plastic is directed at an acute angle through the screen producing a filtered plastic flow through a downstream face of the screen and a flow of debris separated from the filter plastic along the upstream screen face. A compartment extends along the upstream screen face and accumulates the separated debris. A passage in the holder communicates with the debris-accumulating compartment and discharges the accumulating debris. A cooling mechanism regulates the rate at which debris is discharged.

7 Claims, 5 Drawing Sheets

FILTERING DEBRIS FROM MOLTEN PLASTIC

This is a continuation of application application Ser. No. 07/996,023 filed Dec. 23, 1992, now abandoned.

FIELD OF THE INVENTION

The invention relates generally to processing of plastic, and more specifically, to methods and apparatus for removing debris from a flow of molten plastic.

BACKGROUND OF THE INVENTION

Contaminants are often filtered from molten plastic before extrusion or injection. It is known, for example, to construct a filter which includes a rigid foraminous screen and an essentially tubular housing that supports the screen and direct a flow of molten plastic through it. The flow is n plastic at an upstream face of the screen. Heat is applied to the filter to maintain the molten state of the plastic during passage through the filter.

Clogging of the screen has been a problem. The screen is commonly mounted on a slide that permits it to be withdrawn from the housing for clearing. The screen is generally mounted in a circular seating structure. Upstream and downstream sides of the slide will commonly carry circular seals formed of bronze sealing material. The slide may have two screens that can be interchanged by sliding action. When one is in an operative position in-line with the flow of molten plastic, the other is normally external to the housing and available for cleaning.

The clogging problem is particular acute when processing recycled plastic scrap. Such scrap often contains significant quantities of metal debris, including large objects such as screws, bolts and nuts. In such an application, the filter tends to clog quickly. Also, given the very viscous nature of the plastic flow and the very high pressure required to drive the plastic through the filter, the screen can be very quickly damaged. It is also common for metal objects to be forced through the seals, leaving them severely scored and in need of replacement. The present invention address such problems.

BRIEF SUMMARY OF THE INVENTION

In one aspect, the invention provides a filter for removing debris from a flow of molten plastic under pressure. The filter has an inlet for receiving the flow, an outlet for discharging the flow, and a flow path between the inlet and outlet that directs the molten plastic through a screen. The flow path is shaped to direct the flow of molten plastic toward the screen at an acute angle. This creates a flow of filtered plastic through the downstream screen face and a flow of debris separated from the filtered plastic in a predetermined direction substantially parallel to an upstream face of the screen. The screen has an area exposed to the flow of molten plastic which is larger than the effective flow area (cross-section transverse to the direction of flow) of the upstream flow path portion immediately upstream of the debris-accumulating compartment. A compartment extends transversely from the upstream flow path portion, generally in the predetermined direction, with one side open at the upstream screen face. The debris is entrained along the compartment while the filtered plastic follows a downstream flow path portion leading to the filter outlet. In preferred form, the filter defines a surface spaced from the upstream screen face and closing one side of the compartment, the surface being inclined relative to the upstream screen face so that the debris-accumulating compartment narrows progressively in the predetermined direction. As debris is forced along the compartment, residual molten plastic is effectively squeezed from the debris. Means are provided for heating the flow path to maintain the molten state of the plastic.

The filter may be adapted to continuously discharge debris. The filter may be formed with a passage which has an inlet end in communication with the debris-accumulating compartment and a discharge end leading to points external to the filter. Valve means may be used to regulate the flow of debris from the passage under pressure of the flow of molten plastic received at the filter inlet. Mechanical valves may tend to clog, and the valve means preferably comprise a mechanism for cooling the discharging debris flow. The viscosity of residual plastic in the debris is controlled to regulate discharge flow rates.

It is desirable to form the filter in such a manner that the screen is readily removable for clearing of debris or repair. To that end, the filter is preferably formed as a housing with a removable filter cartridge that contains the screen. In the prior art, permitting a screen to be readily removed has required sealing of two pairs of mating surfaces. With the more complex structure of the invention, it is desirable to avoid sealing more than one pair of mating surfaces. In that regard the invention provides a cartridge comprising an internal cavity, and an inlet and outlet formed in one face of the cartridge, both accessing the cavity. A seating structure supports the screen within the inlet, inset from the cartridge face to define the debris-accumulating compartment, ensuring that accumulated debris is removed with the cartridge. The holder has a chamber shaped to receive the cartridge and a seating structure complementary to the cartridge face. The upstream flow path portion is formed in the holder, and a surface extends transversely from the upstream flow path portion, proximate to the cartridge, to close one side of the debris-accumulating compartment of the received cartridge. The cartridge cavity and cartridge outlet cooperate with a discharge passage formed in the holder to discharge filtered plastic to the filter outlet. Sealing material between the holder's seating structure and the cartridge face forms a seal about the cartridge chamber. Means are provided for urging the cartridge towards the holder's seating structure to compress the sealing material. In this manner, only a single pair of surfaces need be sealed.

Other aspects of the invention will be apparent from a description below of a preferred embodiment and will be more specifically defined in the appended claims.

DESCRIPTION OF THE DRAWINGS

The invention will be better understood with reference to drawings in which.

DESCRIPTION OF PREFERRED EMBODIMENTS

Figure 1:
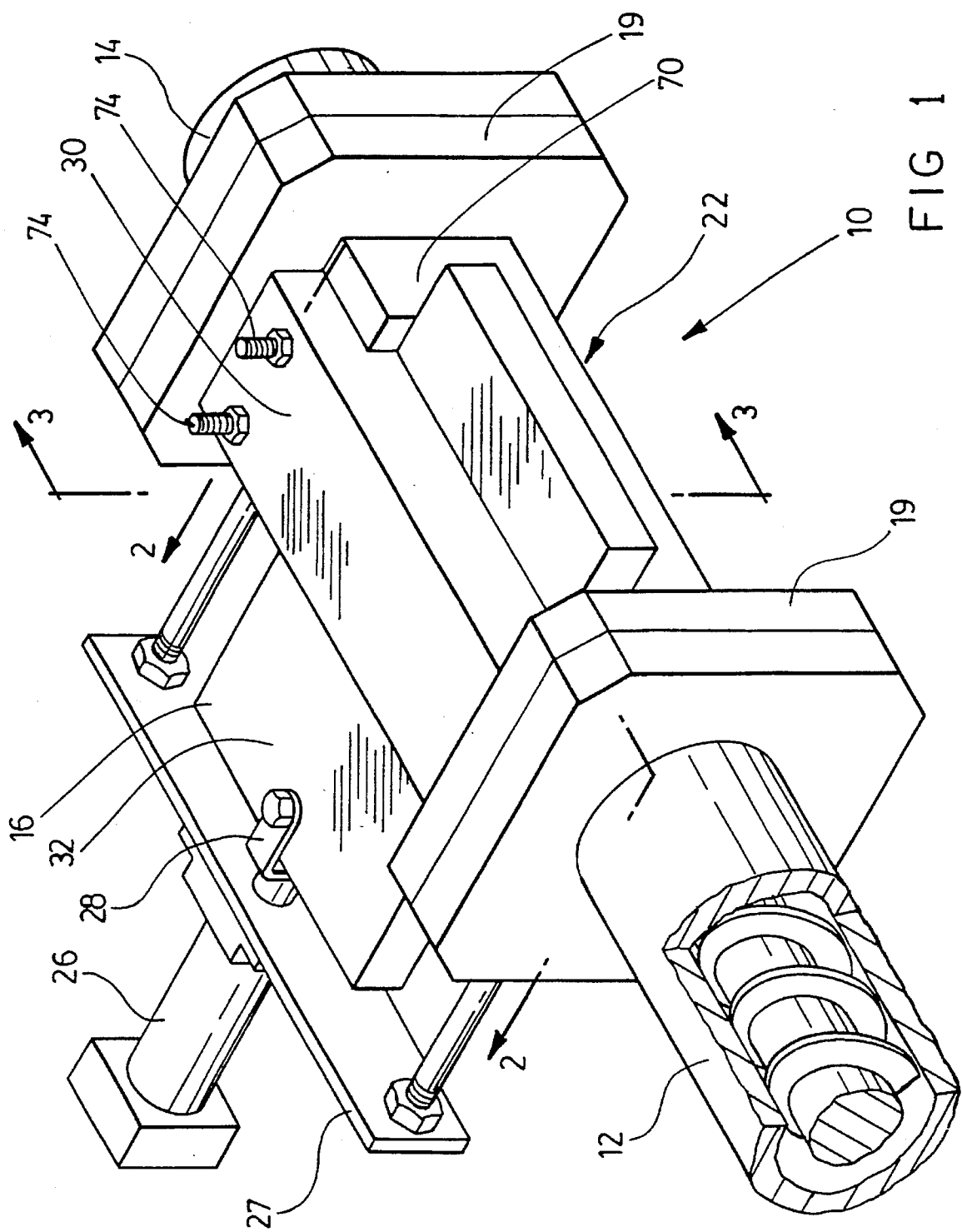
FIG. 1 is a fragmented perspective view showing a filter embodying the invention installed in a plastic recycling line.

Reference is made to FIG. 1 which shows a filter 10 installed in parts of a plastic recycling line. A heated screw drive 12 plasticizes scrap plastic containing debris and directs it under pressure into the filter 10. The filter 10 performs a preliminary course filtering of debris from the flow of molten plastic. It discharges the filtered plastic to a downstream filter 14 (extensively fragmented) of more conventional construction which contains a fine filtering screen. It should be noted that the two-stage filtering process is not essential to practice of the invention.

The filter 10 includes a removable cartridge 16 which contains two screens 18, 20 (not apparent in FIG. 1) and a holder 22 which directs molten plastic to and from the filter cartridge 16. A pair of flanges 19 are bolted to opposing ends of the holder 22 and permit the holder 22 to be operatively connected to the screw drive 12 and to the downstream filter 14 in a conventional manner. The upper surface of the holder 22 is recessed to define a chamber 24 (indicated in FIGS. 2 and 4) that receives the filter cartridge 16. The cartridge-receiving chamber 24 is open on laterally opposing sides of the holder 22 to allow the filter cartridge 16 to slide relative to the chamber 24. A hydraulic cylinder 26 rigidly mounted with a frame 27 to the holder 22 and with a clevis 28 to the filter cartridge 16 interchanges the two screens 18, 20. At any given time, one screen is operatively located within the holder 22 to filter debris from plastic flows. The other screen is then external to the holder 22 and accessible for removal of accumulated debris. Except for relative dimensions and shape, which are apparent from the drawings, the filters 18, 20 are conventional and are rigid steel sheets that are extensively apertured. The filter cartridge 16 is secured to the holder 22 with a pressing element 30 which can be released to permit interchangement of the screens 18, 20 or removal of the cartridge 16 in its entirety from the holder 22.

Figure 2:
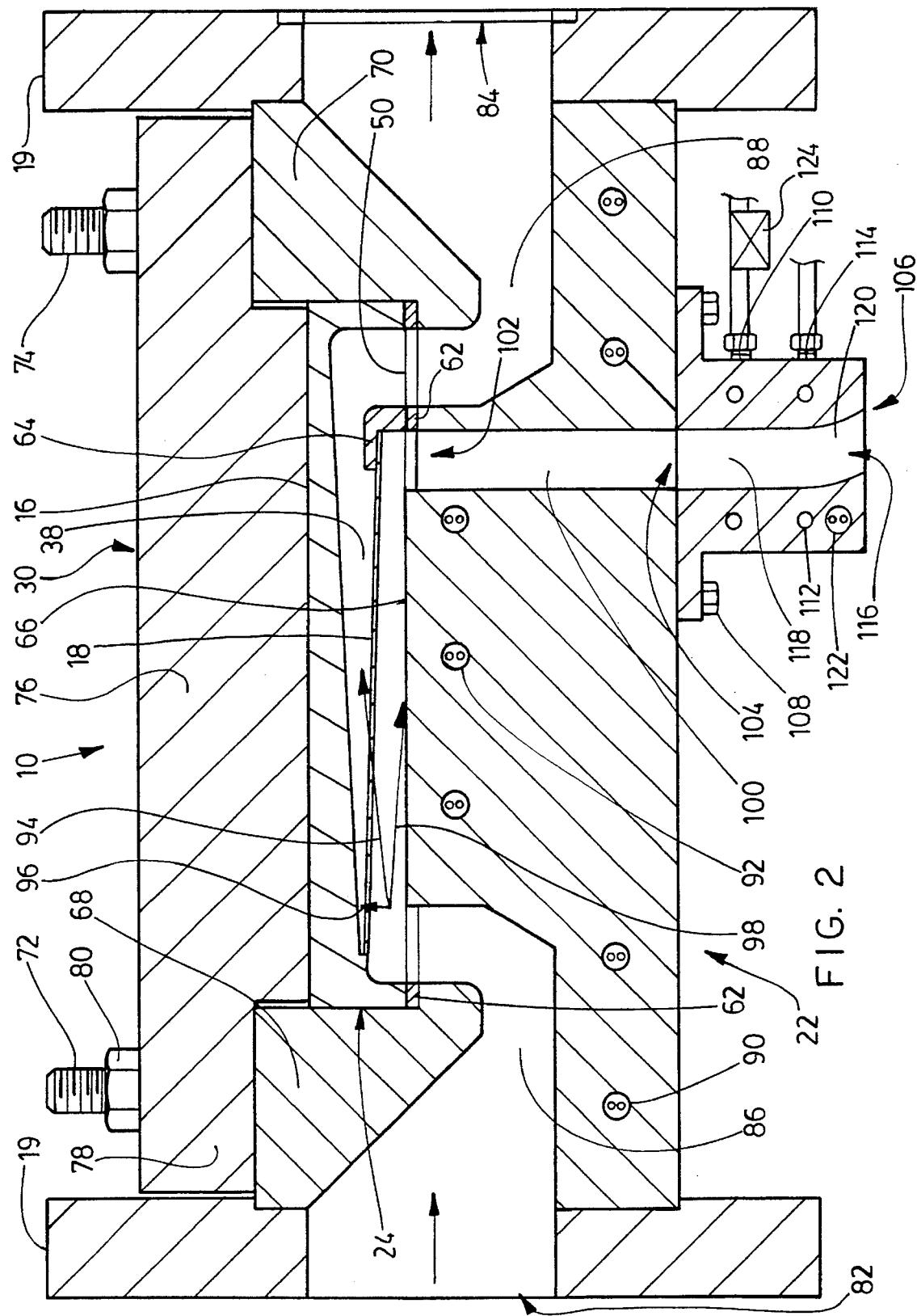
FIG. 2 is a view along lines 2—2 of FIG. 1.
Figure 3:
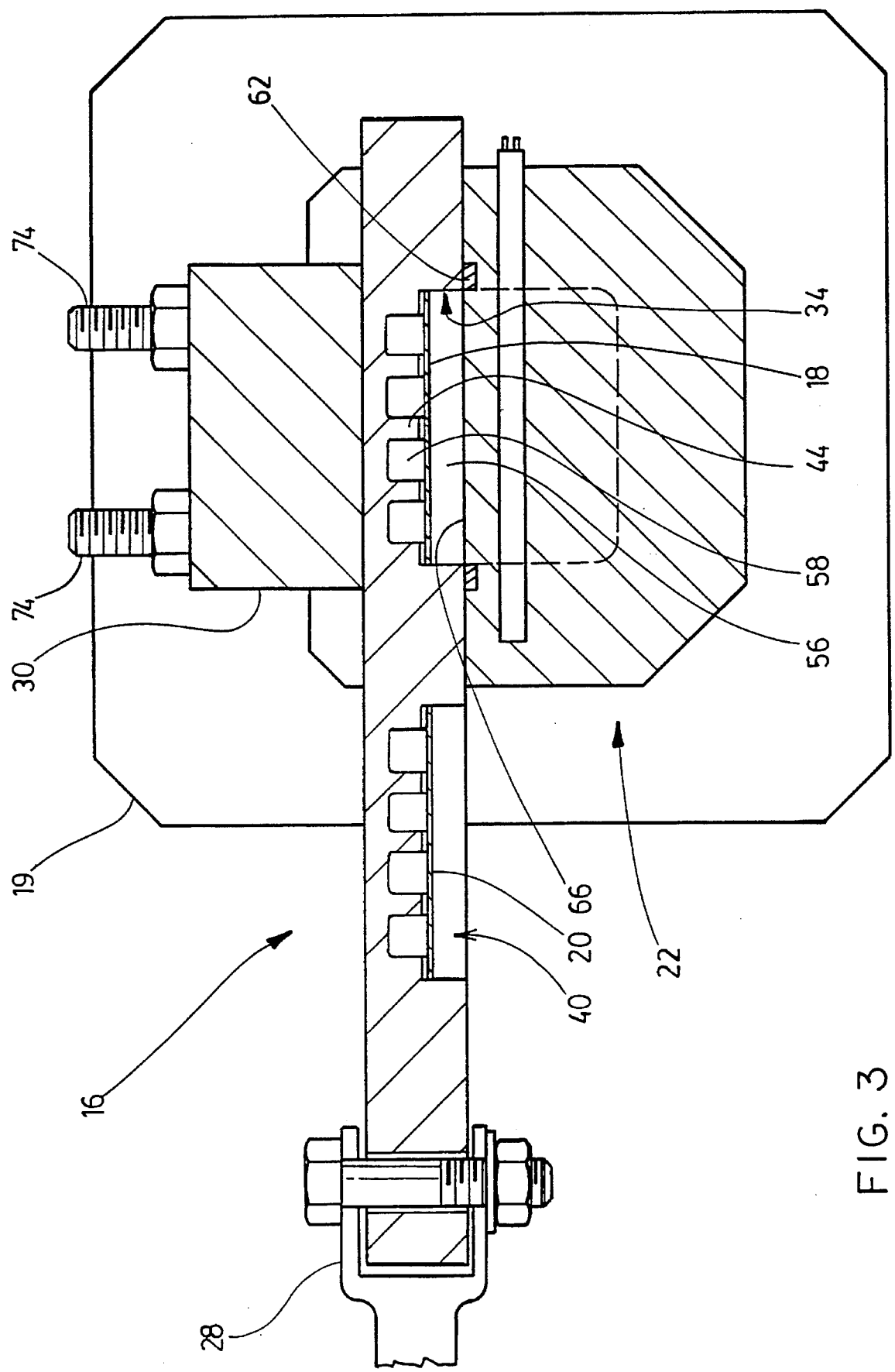
FIG. 3 is a view along lines 3—3 of FIG. 1.
Figure 4:
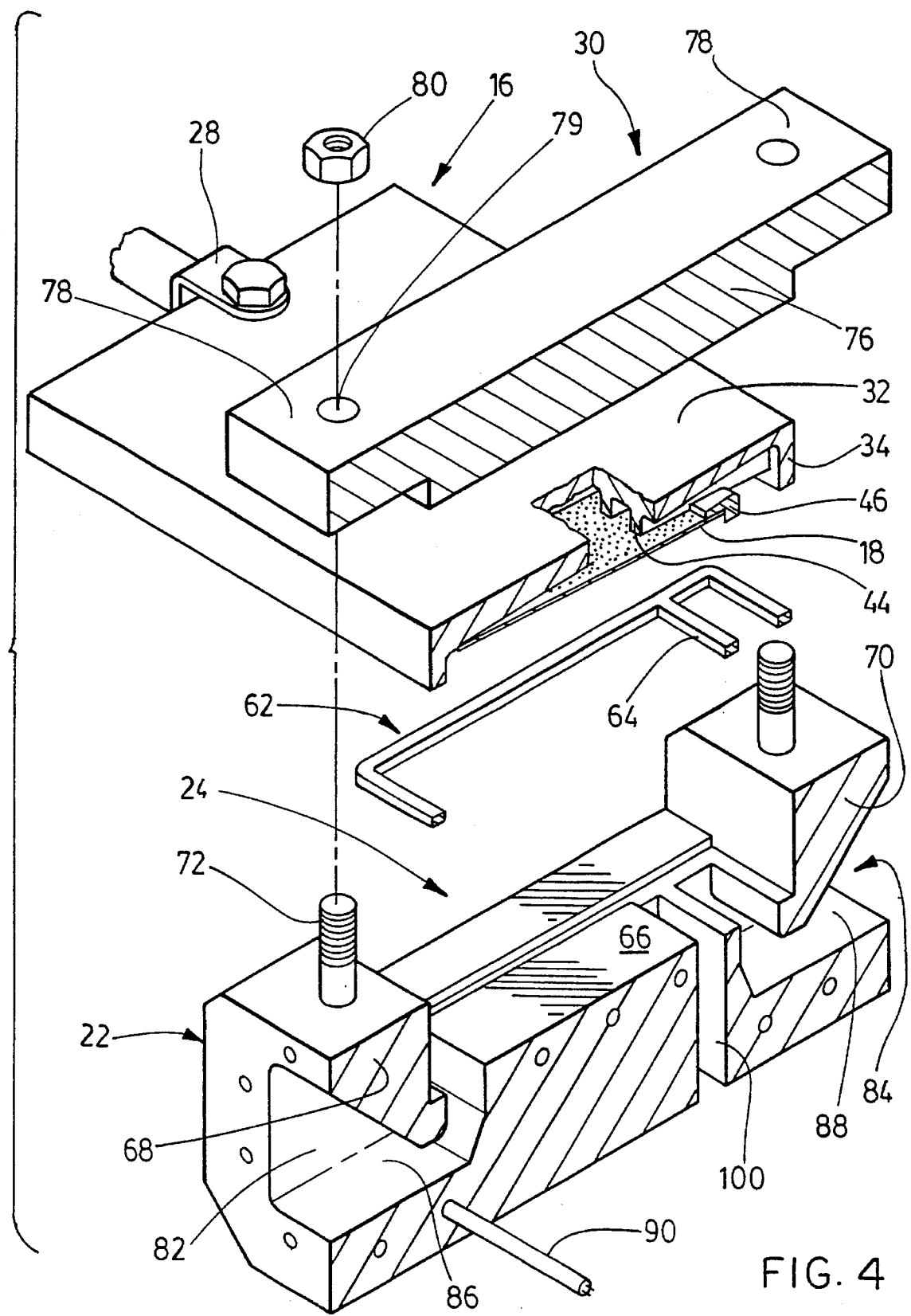
FIG. 4 is an exploded sectional view, partially fragmented, corresponding to the view of FIG. 2; and, FIG. 5 is a fragmented perspective view of a filter cartridge, from below the cartridge.

The construction of the cartridge 16 is more apparent in figs. 2–4. It has a large rectangular end wall 32 which will typically be oriented horizontal in use. The filter 10 can, however, be used in a variety of orientations. Two shallow, generally rectangular circumferential walls 34, 36 (which share a common side) extend downwardly from a lower side of the end wall 32. Together, these walls 32, 34, 36 define a pair of cavities 38, 40 which are effectively recessed into one planar face 42 of the cartridge 16, opposite the end wall 32. Each cavity 38 or 40 contains one of the screens 18 or 20 and structure for directing flows through the screen 18. In the description that follows and in most of the views, only the cavity 38 is described and illustrated. It should be understood, however, that the cavity 40 is identically configured and forms identical flow paths with the housing 22, when the screens 18, 20 are interchanged.

Figure 5:
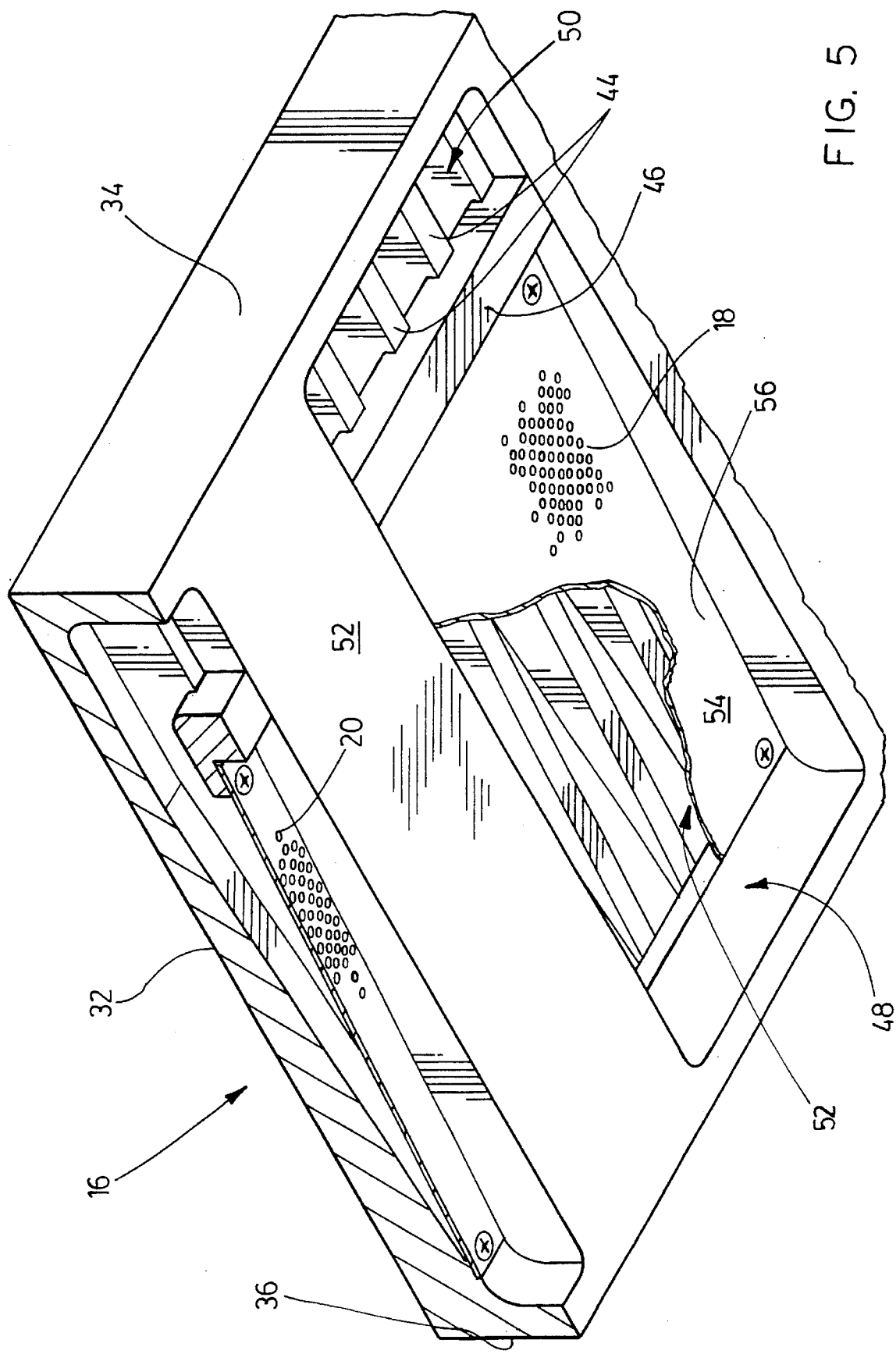

The structures associated with the cavity 38 are most apparent in FIG. 5. Parallel ribs (only one rib 44 specifically indicated) are raised from the end wall 32 within the cavity 38. A steel divider 46 with an L-shaped cross-section is seated in a recess formed in the ribs and bolted transversely to the ribs. The divider 46 together with the circumferential wall 34 define within the open cartridge face 42 an inlet 48 and an outlet 50 associated with the cavity 38. The ribs together with the divider 46 define a seating structure for the screen 18, which is held in place with countersunk screws. The ribs extend substantially along the full width of the downstream screen face 52, providing support against the substantial force applied by molten plastic flows. The ribs are inset from the cartridge face 42 so that the upstream screen face 54 defines a debris-accumulating compartment 56 within the inlet 48. The ribs incidentally define between them axially-directed channels (only one channel 58 specifically indicated) that permit flow through the cavity 38 from the cartridge inlet 48 to the cartridge outlet 50. Except for the dividers and screens, the filter cartridge is an integral structure machined from a block of steel.

The holder 22 is also an integral steel structure. It is machined to define a seating structure 60 for the face 42 of the cartridge 16 at the bottom of its cartridge-receiving chamber 24. The seating structures presents a planar seating surface with a generally rectangular shape conforming to the cartridge face 42, specifically to the end surface defined by the circumferential side wall 34 surrounding the cavity 38. A gasket 62 of bronze sealing material is positioned between that seating surface and the cartridge face 42. The gasket 62 has a generally rectangular peripheral shape that forms a seal extending circumferentially about the cartridge cavity 38 at the cartridge face 42. It includes a strip 64 that forms a seal between the divider 46 and a proximate surface 66 (indicated in FIG. 4) defined by the holder 22, effectively sealing the cartridge inlet 48 from the cartridge outlet 50 when the cartridge 16 is received in the holder 22. That latter seal is not critical and may be eliminated by simply dimensioning the divider 46 to engage or closely approach the surface 66 when the cartridge 16 is seated, to avoid flow of small debris directly between the cartridge inlet 48 and cartridge outlet 50.

The sealing relationship between the cartridge 16 and the holder 22 is maintained by the pressing element 30. The holder 22 has a pair of upwardly-extending portions 68, 70 located at the opposing ends of the holder 22, between which the cartridge-receiving chamber 24 is formed. One pair of threaded shafts 72 is fixed to one upwardly extending portion 68. Another pair 74 is fixed to the other upwardly-extending portion 70 on the opposite side of the cartridge-receiving chamber 24. The pushing element 30 has a central rectangular portion 76 conforming to the cartridge end wall 32. It also has opposing flanges 78 which are formed with vertical clearance holes (only one clearance hole 79 specifically indicated) that receives the threaded shafts 72, 74. Each threaded shaft carries a nut (only one nut 80 specifically indicated) which bears against the upper surface of the pressing element 30 and which can be tightened to urge the pressing element 30 against the upper surface of the cartridge 16. This in turn urges the cartridge 16 against the seating surface of the holder 22, compressing the bronze gasket 62. The pressing element 30 is released of course by releasing the nuts.

Alternative arrangements may be considered to urge the cartridge face 42 against the seating structure 60 of the holder 22. For example, a base may be fixed to the shafts above the pressing element 30. A pair of parallel steel rollers may be mounted between the base and the pressing element 30. The rollers may engage beveled downwardly converging surfaces formed on opposing sides of the base. A hydraulic cylinder may be used to control the separation of the rollers. Drawing the rollers together would force the cartridge 16 downwardly against the seating structure 60 of the holder 22, while separating the rollers would relieve downward forces. Such an arrangement would reduce time and effort required to interchange the screens 18, 20, but the arrangement illustrated is less expensive and satisfactory.

The cartridge 16 and holder 22 cooperate to define a flow path through the screen 18. The holder 22 is machined to define a filter inlet 82 in one of its ends and a filter outlet 84 axially aligned with the inlet 82 in the holder's opposite end. It has an inlet passage 86 constituting an upstream flow path portion leading to the upstream screen face 54. It has a discharge passage 88 which cooperates with the cartridge inlet 48, the cartridge cavity 38, and the cartridge outlet 50 to define a downstream flow path portion leading from the downstream screen face 52 to the filter outlet 84. A surface 85 machined in the interior of the holder 22 extends transversely from the upstream flow path portion. The surface 85 closes or defines one closed side of the debris-accumulating compartment 56 otherwise formed in the cartridge inlet 48. Electric cartridge heaters, such as the heater 90, are mounted in passages formed in the holder 22. The filter cartridge 16 is heated through contact with holder 22. A thermocouple 92 mounted in a passage in the holder 22 is used to regulate temperature. This heats the flow path, maintaining the molten state of the plastic passing through the filter 10.

The direction of flow at the screen 18 should be noted. The upstream flow path approaches the upstream screen face 54 and discharges vertically toward a portion of the upstream screen face 54 distant from the cartridge outlet 50 to which the plastic will ultimately flow within the cartridge 16. The upstream screen face 54 has a surface area exposed to the flow which is several fold larger than the effective flow area (cross-section relative to direction of flow) of the upstream flow path immediately upstream of the compartment 56. The downstream flow path (specifically the cartridge cavity 38 and the flow channels between the ribs 44) tend to direct flows horizontally. The net effect is to induce a flow across the screen 18 at an acute angle relative to the upstream screen face 54. The flow vector 94 is diagrammatically indicated in FIG. 2 and shown resolved into two mutually perpendicular flow vectors 96, 98. The flow immediately upstream of the screen 18 consequently has a flow or velocity component parallel to the upstream screen face 54 in a direction leading into the compartment 56. This tends to displace debris along the relatively extended upstream screen face 54 and along the compartment 56, clearing the region of the upstream screen face 54 where the upstream flow path discharges. Intervals between required cleaning of the screen 18 are consequently reduced. It will also be noted that the screen 18 is angled at about 3–5 degrees relative to the compartment-closing surface of the holder 22 such that the compartment 56 progressively narrows. This tends to funnel the debris flow towards the closed end of the compartment 56 and to squeeze residual plastic from the debris flow.

The filter 10 is further adapted, as apparent in FIG. 2, to permit continual or periodic removal of debris without screen interchangement. A vertical discharge passage 100 is formed in the holder 22. It has an inlet end 102 communicating with the debris-accumulating compartment 56 at a location distant from the upstream flow path. It has a discharge end 104 which leads to the exterior of the holder 22. A novel valve arrangement is used in which the viscosity of the debris flow is varied to control its rate of discharge. A copper cooling block 106 with a flange 108 is bolted to the lower surface of the holder 22. The block 106 has an inlet 110 for receiving a water flow, an internal flow path 112, and an outlet 114 for discharging the water flow. A central passage 116 is formed within the block 106 to receive debris from the discharge passage 100. The central passage 116 includes straight passage portion 118 aligned with the discharge passage 100 and a curved passage portion 120. Cold water is circulated through the cooling block 106 to cool and lower the viscosity of the debris flow, and the curved passage portion 120 provides a measure of resistance to such flow. A thermocouple 122 within the block 106 indicates the temperature of the block 106 and indirectly the temperature of the debris flow. The thermocouple 122 is connected in a standard fashion to a controllable flow valve 124 (diagrammatically illustrated) at the water inlet 110 to regulate flow so as maintain a preset temperature. The appropriate temperature for the block 106 may be empirically determined by observing discharge flow rates. The general objective is to ensure that the discharge flow does not contain an excessive quantity of plastic and does not effectively by-pass the screen 18. A conventional gate valve or other mechanical valve mechanism may be substituted, but the arrangement illustrated is less subject to clogging. Large objects are likely to remain trapped within the debris-accumulating compartment 56, and bridging among items of debris is apt to continue to induce clogging. Discharging of debris, however, reduces the intervals at which the screens 18, 20 must be interchanged and manually cleared.

The method of the invention will be largely apparent from the foregoing description of the filter 10, but will be briefly described. A molten flow of scrap plastic under pressure is introduced at the filter inlet 82. It is directed at an acute angle through the upstream screen face 54 resulting in a filtered plastic flow through the downstream screen face 22 and a debris flow along the upstream screen face 54 into the compartment 56. The filtered plastic flows along the downstream flow path to the filter outlet 84. The debris is funneled and compacted along the length of the tapered compartment 56. In the preferred form, the accumulating debris is forced through the discharge passage 100. The temperature of the cooling block 106 is set substantially as described above, to permit discharge of debris without by-passing the filtering screen 18.

It will be appreciated that a particular embodiment of the invention has been described and that modifications may be made therein without departing from the spirit of the invention or necessarily departing from the scope of the appended claims.

We claim:

1. A filter for removing debris from a flow of molten plastic under pressure, comprising:

a cartridge comprising walls defining a cavity, a cartridge face, means defining a cartridge inlet that extends through the cartridge face and accesses the cavity and a cartridge outlet that extends through the cartridge face and accesses the cavity separately from the cartridge inlet, a screen, and means mounting the screen in the cartridge inlet with the screen inset from the cartridge face thereby to define within the cartridge inlet a debris-accumulating compartment with an open side at the cartridge face;

a holder shaped to receive the cartridge, the holder comprising an holder inlet for receiving the flow of molten plastic, a holder outlet for discharging the flow of molten plastic, a seating structure shaped to seat the cartridge face of the received cartridge, an inlet passage extending from the holder inlet to the cartridge inlet of the received cartridge and discharging the received flow of molten plastic toward the screen of the received cartridge thereby to separate the debris from the plastic, a surface extending transversely from the inlet passage and positioned to close the open side of the debris-accumulating compartment of the received cartridge thereby to contain the separated debris within the debris-accumulating compartment, and a discharge flow path extending from the cartridge outlet of the received cartridge to the holder outlet;

sealing material forming a seal between the seated cartridge face and the seating structure of the holder;

cartridge-securing means releasably securing the received cartridge to the holder such that the cartridge can be displaced from the holder to allow access to the debris-accumulating compartment from externally of the holder, the cartridge-securing means comprising means for urging the received cartridge toward the seating structure of the holder thereby to compress the sealing material between the cartridge face and the seating structure of the holder; and, means for heating the holder and cartridge thereby to maintain the molten state of the flow of plastic.

2. The filter of claim 1 in which the cartridge comprises:

an end wall;

a circumferential side wall extending from the end wall and terminating at the cartridge face, the side wall extending about the cavity of the cartridge; and, a plurality of ribs extending from the end wall toward the cartridge face and engaging the screen, the ribs defining between them a plurality of channels extending from the cartridge inlet to the cartridge outlet.

3. The filter of claim 1 in which:

the holder comprises a pair of horizontally spaced-apart holder portions and a chamber between the holder portions;

the chamber opens upwardly and is open at laterally opposing sides of the holder such that the cartridge can be removed laterally from the chamber; and, the seating structure of the holder defines a seating surface below the chamber on which the sealing material is seated.

4. The filter of claim 3 in which the means for urging the cartridge against the seating structure of the holder comprise:

a pair of threaded shafts fixed each fixed to a different one of the holder portions;

a pushing member shaped to engage the received cartridge and comprising clearance holes receiving the plurality of threaded shafts; and, a plurality of nuts each secured to a different one of the threaded shafts and bearing against the pushing member.

5. The filter of claim 1 in which the holder comprises a debris discharge passage for discharging debris from the debris-accumulating compartment, the debris discharge passage having an inlet end at the surface of the holder that closes the open side of the debris-accumulating compartment and a discharge end leading to points external to the holder.

6. The filter of claim 5 comprising valve means for regulating flow of debris along the debris discharge passage.

7. The filter of claim 6 in which the valve means comprise means for cooling the flow of debris.

* * * * *